May 1, 1962     D. S. WISE     3,032,708
SHORT INDICATOR
Filed April 4, 1957
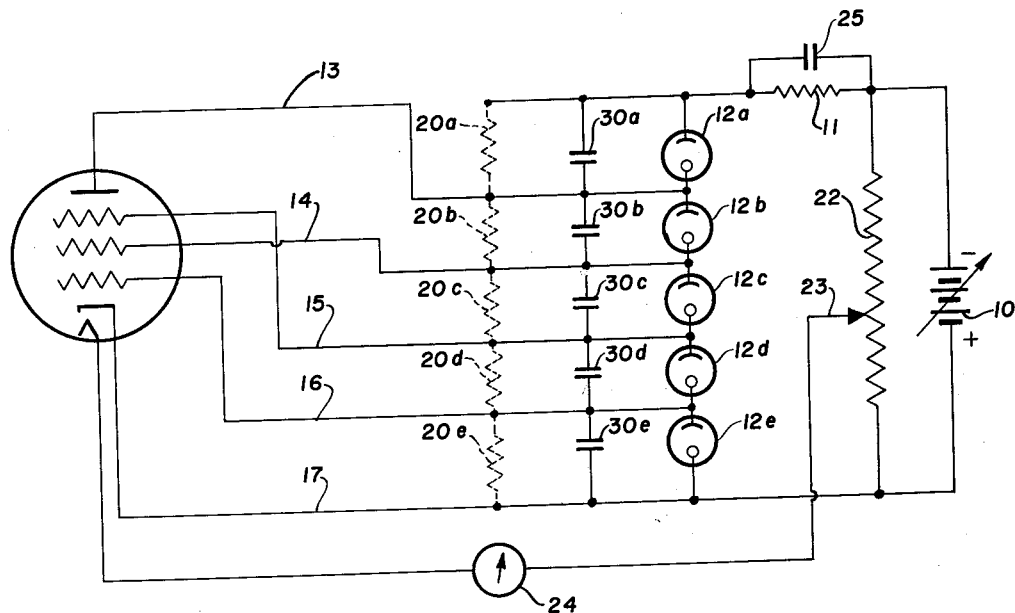
INVENTOR.
DAVID S. WISE
BY J. D. Douglas
ATTORNEY

3,032,708
SHORT INDICATOR
David S. Wise, Cleveland, Ohio, assignor to The Hickok Electrical Instrument Company, Cleveland, Ohio
Filed Apr. 4, 1957, Ser. No. 650,669
10 Claims. (Cl. 324—20)

This invention relates to improvements in means for indicating the state of electrical conduction between discrete points in an electrical apparatus and more particularly to an apparatus which is useful as a short indicator for use in conjunction with the testing of vacuum tubes.

In testing vacuum tubes, it is desirable prior to operational testing of the tube to determine whether or not any of the elements are shorted to each other or there are any current paths which are of an order to cause imperfect operation. Heretofore this has usually been effected by connecting a source of potential to the elements through the means of a rotary switch which caused an indicator tube to light up in the event of a short between any of the elements. This was a time consuming and therefore sometimes neglected operation, particularly when the testing was being done by an uninitiated person, with the result that subsequently damage could occur to the testing apparatus when the dynamic characteristics were measured.

Although recently certain devices have appeared on the market where the existence of shorts, between any two or more elements could be determined simultaneously they did not determine the degree of the short and were not as sensitive to the presence of resistance paths that did not constitute a short but which did affect the dynamic characteristics of the tube under test.

Very recently there has come on the market a device where tubes to be tested may be tested by placing a key card in a suitable receptacle, inserting the tube and pushing one or more buttons. With such a device it becomes desirable to provide an indicator which, when the machine is set up automatically provides a short indication without any further effort on the part of the operator.

It will be appreciated that shorts in tubes may be due to several causes and result in high or low resistance shorts. Frequently a high resistance short was sufficiently high in resistance to prevent an indication as a short and would not materially affect its reaction to the dynamic test but which would eventually result in a break-down during use.

These prior devices also did not indicate the presence of "poisoned" elements which can be located with the present invention.

By the present invention it is possible to determine the presence of high and low resistance shorts, the approximate value and the exact place where the short is present.

A still further advantage of the invention is that it can be arranged to provide a flashing indication the periodicity of which indicates the value of the short. The flashing indication of itself is more apparent to the operator than a steady glow and therefore assures a quicker and more ready determination of this condition.

Still other advantages of the invention and the invention itself will become more apparent from the following description of an embodiment of the invention which is illustrated by the accompanying drawings and forms a part of the specification.

In the drawing:

The FIGURE is a schematic view of the invention as applied to a tube tester.

In its broader aspects the invention contemplates the provision of a potential source across which a plurality of gas discharge tubes are connected in series with each other. Since they are in series, the voltage of the source is arranged so that it is of insufficient magnitude to normally cause them to fire. If, however, the resistance across any one of the tubes is lowered a predetermined amount the remaining tubes in the series fire. The junctions of the tubes to each other are connected to the elements of the tube under test so that any two of the elements are in effect in shunt with at least one of the tubes. Should there be a lowered resistance between any two elements, this results in lowering the resistance across one or more of the tubes providing a larger voltage to the remaining tubes which will fire, giving a visual indication.

More specifically, a variable potential source is indicated at 10, the negative end of which is connected through a current limiting resistance 11 to a string of serially connected gas discharge tubes 12a to 12e inclusive. The lower end of the string of discharge tubes is connected to the positive side of the potential source.

It should be noted that the gas discharge tubes should be of such a character that their combined striking voltage is more than that of the potential source when connected in series as indicated. Therefore, under these conditions the tubes offer substantially infinite resistance and no firing occurs.

Connections are made to the junctions of the tubes 12a and 12b, 12b and 12c and so on down the line with a final connection to the bottom end of the string which is the positive end of the potential source.

These various connections are effected by conductors 13 to 17 inclusive, which extend to the connection on a socket for receiving a vacuum tube to be tested. In the interest of simplification the socket is omitted and the connections all shown running directly to the tube elements. The more negative end of the string is connected to the anode at the junction of tubes 12a and 12b. The next connection by line 14 is to the screen grid. The next by line 15 to the suppressor grid. The next to last by line 16 to the control grid and the bottom end by line 17 to the cathode. By connecting in the manner indicated, with the most negative potential end applied to the anode and the other elements connected in the inverse order of their normal operating potentials to the potential source any possible conductance due to emission of heated elements which would give a false indication of a short is eliminated.

It should be pointed out that the connections are merely illustrative of how the connections could be made for a pentode tube, and that other forms of connection can be made so long as the polarity is such that no emission in the tube under test occurs.

This device is particularly useful in the location of so-called "poisoned" grids wherein by previous operation the grid has become contaminated with emitting material from the cathode. In this case the heating of the grid from the cathode or filament would cause the grid to emit, resulting in conduction which although not a short is as undesirable a condition as a short.

It should be also pointed out that although the device is particularly useful in a tube testing circuit, the leads 13 to 17 could be connected into any kind of apparatus wherein the presence of current leakages or shorts was to be determined. Furthermore, it will be apparent that although a pentode is shown any type of tube having two or more elements may be tested with this circuit.

The circuit as described is fundamental to the invention, should a finite resistance be present between any two or more of the elements this resistance would be in shunt with one or more of the gas discharge tubes and would cause an increase in voltage to the other tubes, causing them to fire. The tubes in the circuit where there is no resistance or where it is very high will fire and give a visual indication. Should all the elements be shorted the tube 12a will fire.

With this circuit the sensitivity may be changed to cause certain predetermined values of decreased resistance across the tubes to give an indication by adjusting the potential source 10.

It will be apparent that insofar as the invention has been described, the circuit is extremely sensitive. For some purposes this sensitivity may be a detriment rather than an advantage.

Should it be desired that the sensitivity be reduced, shunting resistance 20a to 20e inclusive, of desired values, shown in dashed lines, may be provided. If certain parts of the string are required to be more sensitive than others, the connection to the resistance for that tube is omitted.

A condenser 25 is disposed across the current limiting resistor 11 to eliminate any effect of alternating current fields that may be present.

In order to make the above circuit provide a more striking indication and one which will more readily attract attention to the fact that a finite resistance path or short exists, each of the gas discharge tubes is shunted by a condenser such as 30a to 30e inclusive. These condensers, as does the condenser 25 across the current limiting resistor, provide a low impedance to alternating currents and prevent any such currents from providing spurious indications which is liable to occur due to the inherent sensitivity of the device. What is more important however, is the fact that these condensers in combination with the discharge tubes and the value of the short or leakage resistance present provide relaxation oscillation. This causes the tubes to flash brightly, which attracts the attention, and, the periodicity of the flashing indicates the degree of the short which is more easily ascertainable by this means than any attempt to determine various degrees of brightness.

In addition, these condensers actually increase the sensitivity of the circuit in the manner desired in that should the short be of a high resistance type one of the condensers will charge until the voltage becomes large enough to cause firing of the tube and then a slug of current is released which causes the tube to fire brightly.

Provision is also made to indicate cathode to filament leakage. This includes a potentiometer type resistance 22 the swinger 23 of which is connected through a current indicator meter 24 to the filament of the tube under test. The resistance 22 can be as indicated or a tapped resistance to apply various voltages. This is desirable because the cathode to filament leakage must be related to some order of magnitude which determines whether the tube is acceptable and this can be determined by the current indicated in the meter 24.

It will be apparent that I have provided a short indicator which readily adapts itself to automatic tube testing apparatus and wherein the location of all the shorts can be determined simultaneously.

Having thus described the invention in an embodiment thereof, I am aware that numerous and extensive departures may be made therefrom without departing from the spirit of the invention as defined in the appended claims.

I claim:

1. A circuit for the determination of the condition of conduction or non-conduction between the discrete elements of a vacuum tube which comprises a source of voltage, a series of glow discharge devices connected in series across the source of voltage and means connecting the discrete elements of the tube to the junctions of said glow discharge devices with each other.

2. An apparatus as described in claim 1, wtherein the series string of glow discharge devices provides a break down resistance greater than that supplied by the source of voltage.

3. A short indicator for indicating shorts between the elements of a vacuum tube comprising a source of potential, a plurality of discrete glow tubes connected across the source of potential in series with each other, said glow tubes as connected having a combined voltage break down greater than the source of potential but less than the source of potential when the resistance across any glow tube becomes lower than normal, means connecting each of said tube elements into the series of glow tubes and means connected across the glow tubes to cause a relaxation oscillation in each glow tube when it fires.

4. An apparatus for indicating shorts between the elements of a vacuum tube or the like comprising a source of potential of predetermined value, a plurality of glow discharge tubes connected in series with each other and the source of potential, the combined firing voltage of the discharge tubes being greater than that of the potential source, means for connecting the elements of the tube under test to the junctions of said glow tubes to each other, the presence of a resistance of a value lower than a predetermined amount between any two or more of said elements effecting a lowering of the resistance of one or more of said discharge tubes effecting an increase in potential to the remaining tubes causing them to fire.

5. An apparatus as described in claim 4, wherein a voltage dividing resistance is disposed across the source of potential and means is provided connecting said voltage dividing resistance to at least one element of the tube.

6. A device as described in claim 5, wherein the voltage dividing resistance is applied to the filament of the tube under test.

7. An apparatus for indicating shorts or finite resistance between the elements of a vacuum tube comprising a source of potential, a series of glow discharge tubes connected in series with each other and through a current limiting resistance to the source of potential, means for connecting the elements of the tube under test in the reverse order of their normally applied voltages to the junctions of discharge tubes starting with the junction of a first tube, connected to the negative end of the source of potential, with the second tube in said series and proceeding down the junction of the string of discharge tubes to the positive end of the potential source.

8. An apparatus as described in claim 7, wherein a voltage divider is provided across the potential source and means connects said divider to the filament of the tube and current measuring means is provided in said connector means.

9. An apparatus as described in claim 7, wherein capacity means is shunted across a glow tube to form a relaxation oscillation with the glow tube when it fires.

10. An apparatus as described in claim 9, wherein the glow tubes are shunted by a resistance to decrease their sensitivity.

References Cited in the file of this patent

UNITED STATES PATENTS

| | | |
|---|---|---|
| 1,762,712 | Charlton | June 10, 1930 |
| 1,916,102 | Fausett | June 27, 1933 |
| 2,429,764 | Moore | Oct. 28, 1947 |
| 2,531,345 | Rickard | Nov. 21, 1950 |
| 2,619,619 | Trevor | Nov. 25, 1952 |
| 2,645,754 | Pitinsky | July 14, 1953 |
| 2,682,637 | Brewer | June 29, 1954 |
| 2,706,273 | Delangis | Apr. 12, 1955 |
| 2,752,563 | Bowden | June 26, 1956 |

FOREIGN PATENTS

| | | |
|---|---|---|
| 619,036 | Germany | Sept. 20, 1935 |
| 472,168 | Great Britain | Sept. 14, 1937 |